W. F. GREEN & C. W. LINEKER.
PIVOT LIGHT.
APPLICATION FILED AUG. 12, 1910.

996,405.

Patented June 27, 1911.
2 SHEETS—SHEET 1.

Witnesses
H. A. Stock.
H. P. Schroeder

Inventors
William F. Green
Charles W. Lineker
By E. E. Vrooman,
Attorney

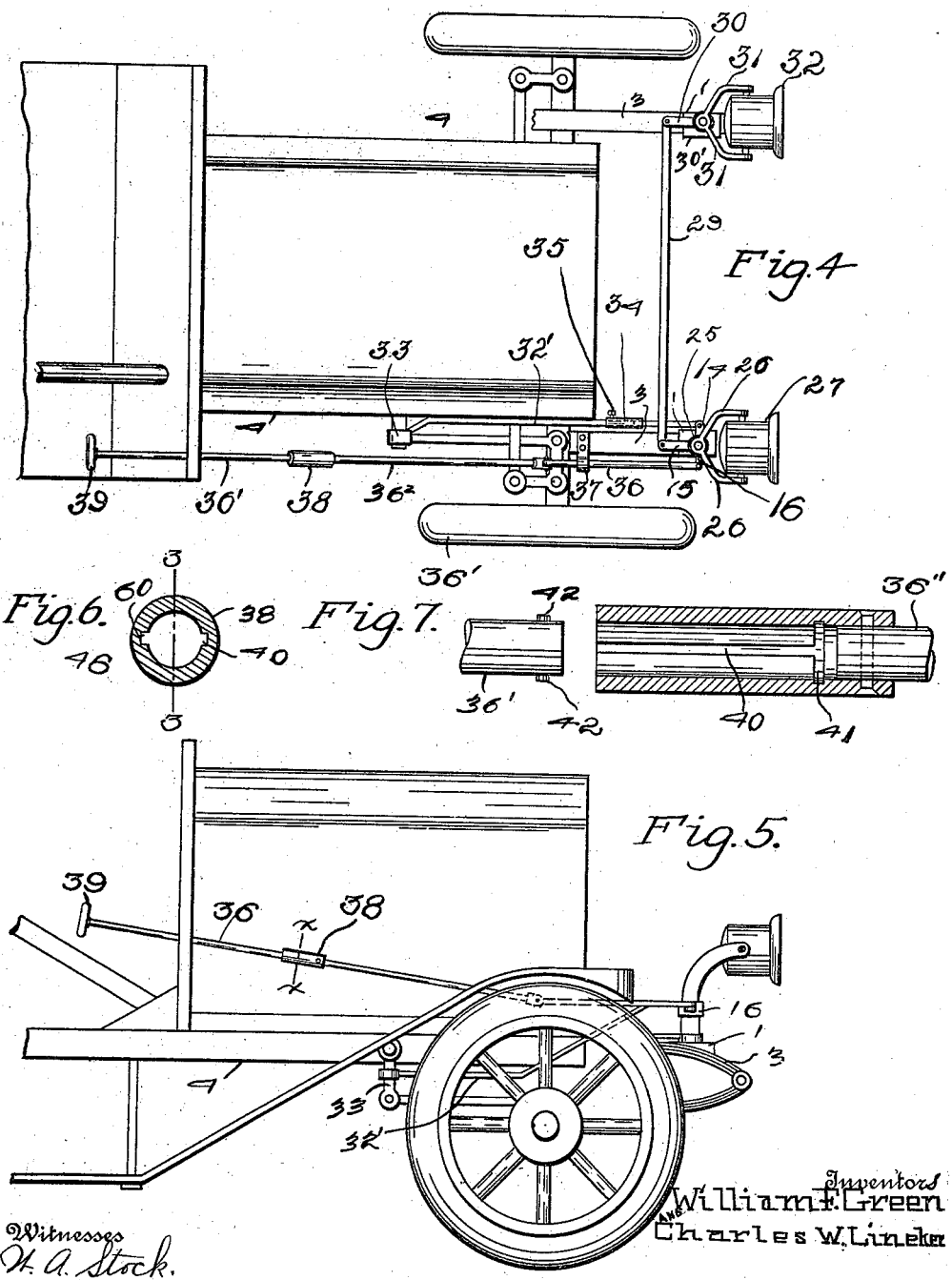

UNITED STATES PATENT OFFICE.

WILLIAM F. GREEN, OF MODESTO, AND CHARLES W. LINEKER, OF OAKLAND, CALIFORNIA.

PIVOT-LIGHT.

996,405.  Specification of Letters Patent.  Patented June 27, 1911.

Application filed August 18, 1910. Serial No. 577,813.

*To all whom it may concern:*

Be it known that we, WILLIAM F. GREEN and CHARLES W. LINEKER, citizens of the United States, residing at Modesto, county of Stanislaus, and Oakland, county of Alameda, State of California, respectively, have invented certain new and useful Improvements in Pivot-Lights, of which the following is a specification.

This invention relates to automobile lamps and has special reference to apparatus connecting the lamps with the steering mechanism so that the lamps may be turned to throw the light in conformity with the curves followed by the machine in changing its course.

The invention has for its object to provide an improved apparatus of this kind by means of which both lamps may be simultaneously turned as the front axle is turned by the steering mechanism, and also so that one of the lamps may be turned independently of the other and moved so as to throw the light in any desired direction.

Figure 1:
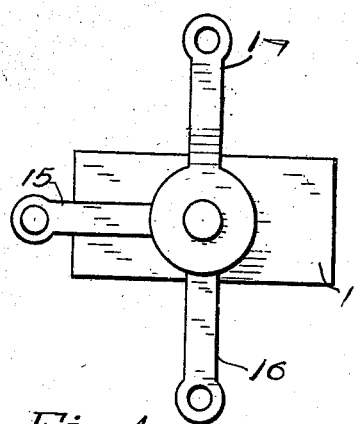
Figure 2:
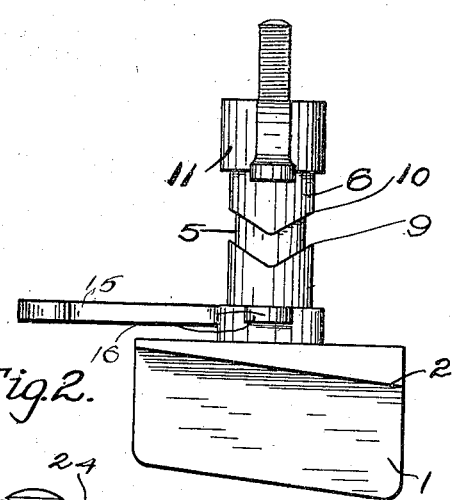
Figure 3:
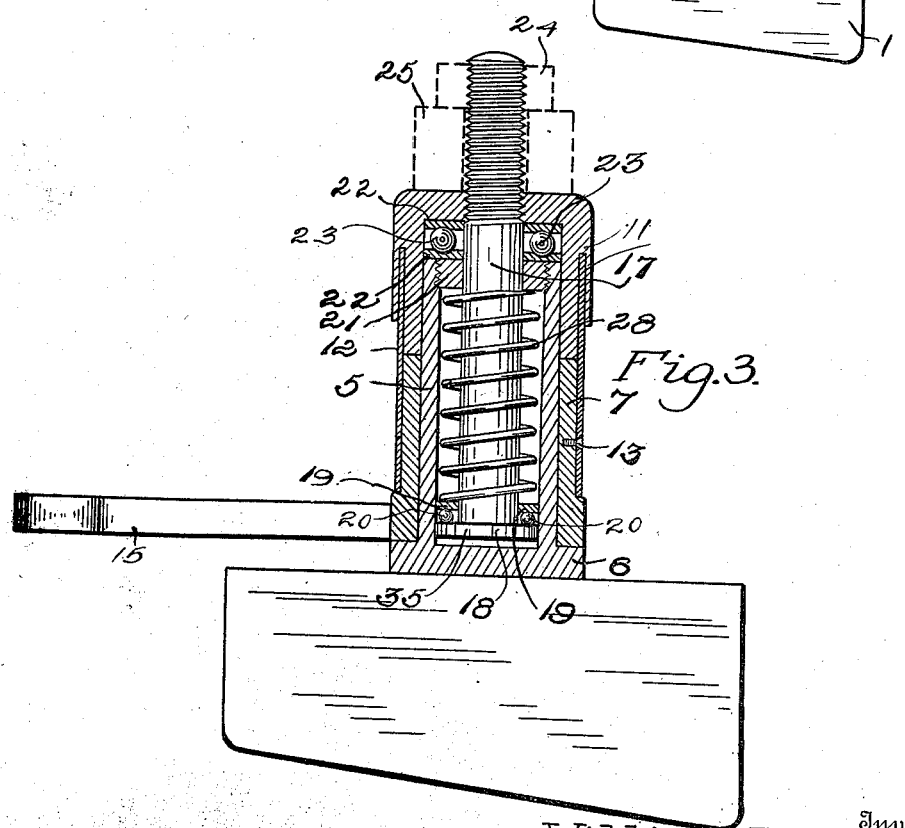

Referring to the accompanying drawings:—Figure 1 is a plan view of a portion of a device for turning the lamps. Fig. 2 is a detail view in elevation of a device shown in Fig. 1 with the casing removed and the upper portion of the device in elevated position. Fig. 3 is an enlarged detail view in vertical section of the device shown in Fig. 2 with the same closed. Fig. 4 is a plan view of a portion of an automobile with the mechanism constructed in accordance with this invention for turning the lamps. Fig. 5 is a side view of the front end of an automobile showing the apparatus for turning one of the lamps. Fig. 6 is an enlarged detail view in transverse section on the line X—X of Fig. 5. Fig. 7 shows two detached portions of the joint shown in Fig. 5.

In carrying out the invention a support is provided for each of the lamps said support being constructed with a base portion 1 formed of a casting having a beveled inclined portion 2 which fits upon the top of a spring 3 of an automobile 4 and is detachably secured thereto in any suitable manner.

The casting 1 has projecting from its top and formed integral therewith a cylindrical casing 5 having a flange 6 at its bottom. Seated on the flange 6 is a cylindrical member 7, secured rotatably upon the casing 5.

The member 7 is formed with V-shaped recesses 9 opposite each other in which are seated V-shaped projections 10 of a second cylindrical member 11, and vertically slidable on the casing 5 and surrounding the members 7 and 11 is a thin cylindrical shell or casing 12 which is fastened to the lower member 7 by means of a set screw 13 and has its upper end projecting into a cylindrical slot 14 in the upper member 11. The lower member 7 of one of the lamp supports is provided with two arms 14 and 15 projecting at a right angle to each other and the other member 11 is formed with an arm 16 projecting in alinement with the arm 14 and at a right angle to the arm 15.

Within the casing 5 is mounted a vertical bolt 17 having a flange 18 at its lower end. Mounted above said flange 18 on the bolt 17 is a circular steel washer 19 and between the washer 19 and the flange 18 are located balls 20 forming ball bearings. The upper end of the casing 5 is closed by the disk 21 screwed into the top of said casing and having a central opening through which projects a bolt 17. The upper inner end of the member 11 is spaced a short distance from the top of the casing 5, and located in the upper and lower ends of said space are steel disks 22 between which are located balls 23 which serve as ball bearings. The upper end of the bolt 17 is screw-threaded, and engages the screw-threaded hole in the upper end of the member 11. Mounted on the upper end of the bolt 17 and clamped against the top of the member 11 by means of a nut 24 is the pivotal portion 25 of the bracket arms 26 in which is mounted the lamp 27. Mounted on the bolt 17 within the casing 5 is a coil spring 28 which is placed therein under considerable pressure, and has one end fastened to the steel washer 19. It will be seen that by means of this construction that as the arm 16 of the member 11 is pulled to cause the member 11 to rotate and by reason of the tapering projection 10 seated in the tapering recess 9 will be raised by the tapering projection 10 on the incline of the opposite tapering recess 9. In this movement the friction is relieved by the ball bearings hereinbefore described in the casing 5 and in the upper end of the member 11. This rotary movement of the member 11 causes the lamp 27 to be turned at an angle, and the coil spring 28 having been put under increased tension by said movement when the pull on the arm 15 is released reacts to automatically move the member 11 back to its normal position and thereby bring the lamp 27 to normal position as shown in Fig. 4. The arm 15 projecting from the member 7 extends rearwardly from the lamp and the end of the arm 15 is pivotally connected at one end to a rod 29 the other end of which is pivotally connected to an arm 30 which extends rearward from a rotary member mounted on a support 32' secured to the spring 3 the rotary member 30' carrying the arms 31 of the lamp 32.

The lamps are turned in unison by means of a rod 32 pivoted at one end to the end of the arm 14 and connected to an arm 33 of the regular steering gear. The rod 32' is made in two sections which are held together by a sleeve 34. One portion of the rod 32 is permanently fixed to the end of the sleeve 34 and the other portion of the rod projects into the sleeve 34 and is fastened by means of the set screw 35. The sleeve 34 is of such a length that during the day the set screw can be removed leaving the movable part of the rod free to work back and forth by the action of the steering gear without moving the lamp.

Pivoted to the arm 16 and projecting from the rotary member 7 is a rod 36 which extends through a sleeved bracket 37 on the frame of the machine, and is formed in two parts connected by the sleeve 38, one of the parts of said rod terminating in the handle 39 located near the steering mechanism. The sleeve 38 which is shown in detail in Figs. 6 and 7 consists of a hollow cylindrical shell containing two longitudinal grooves 40 and a transverse circular groove 41. The movable portion 36' of the rod 36 has its end projecting into the cylindrical shell forming the sleeve 38 and is provided with pins 42 which slide in the grooves 40. The other portion 36² of the rod 36 is fastened in any suitable manner to the end of the sleeve 38. When it is desired to couple the two portions of the rod 36, the movable portion 36' is pushed into the sleeve until the pins 42 arrive at the circumferential groove 41 when the rod is given a turn and the pins 40 are brought into engagement with the groove 41 and thereby fasten the movable portion of the rod in the sleeve 38.

It will be seen that by means of the construction hereinbefore set forth that the lamps are mounted on two rotary pedestals and are connected so as to rotate in unison and turn the lamps in the same direction. This is accomplished by means of the rod 32' connected with the steering mechanism. When it is desired to turn only one of the lamps the lamp 27 is turned by means of the rod 36, one portion of the rod 32' having been unfastened from the sleeve 34, thereby preventing the movement of the lower portion of the pedestal through the operation of the steering mechanism. The rod 36 which is connected with the arm 16 projecting from the upper part of the pedestal only operates the lamp 27, since it causes only the upper member 11 of the pedestal to rise and turn.

Having described the invention, we claim:—

1. In an automobile or similar vehicle, a pair of lamps, rotary pedestals on which said lamps are mounted, each of said pedestals having an arm, a connecting rod pivotally connected to the arms of said pedestals, a second arm on one of said pedestals having a rod connecting said arm with the steering mechanism of the automobile and formed in sections one slidable from the other, one of said pedestals being formed with two rotary members and one of the lamps being mounted on one of said rotary members, an arm projecting from said rotary member, and a rod pivotally connected to said arm and extending to a point adjacent to the steering wheel of the automobile.

2. In an automobile or similar vehicle, two rotary pedestals at the front of the machine, each having rearwardly extending arms, a rod pivotally connected at its ends to said arms, one of said pedestals being formed with two rotary members, one of which is adapted to ride over and be lifted up by the other as it is rotated, one of said lamps being mounted on said vertically movable member of said pedestal, a rod connecting the lower member of said pedestal with the steering gear of the machine and formed in two parts detachably connected together, and a rod connected with the upper movable member of the pedestal and extending to a point adjacent to the steering wheel.

3. In an automobile or similar vehicle, a support for a lamp consisting of a base portion, a cylindrical vertical casing projecting upward from said base portion and closed at its upper end, a vertical bolt located in said cylindrical casing and projecting through the top of the same, a coil spring located on said bolt in said casing, two rotary cylindrical members inserted in said casing and mounted one above the other, the lower rotary cylindrical member being formed at its upper edge with opposite V-shaped grooves, and the upper rotary member being formed with depending V-shaped projections projecting into said grooves, two arms extending from the lower rotary member at right angles to each other, and an arm projecting from the upper rotary member, at a right angle thereto, the bolt located in said casing having a flange at its lower end, a metallic disk adjacent to the flange of the bolt, ball bearings located between said flange and disk, metallic disks at the upper end of the upper vertically movable member, ball bearings located between said disks, and a lamp and lamp bracket mounted on the upper end of said bolt, and clamped to said rotary member.

In testimony whereof we affix our signatures in presence of two witnesses.

WILLIAM F. GREEN.
CHARLES W. LINEKER.

Witnesses:
H. C. SCHROEDER,
F. P. SCHROEDER.